United States Patent [19]
Chi

[11] Patent Number: 5,886,254
[45] Date of Patent: Mar. 23, 1999

[54] TIRE VALVE PRESSURE-INDICATING COVER UTILIZING COLORS TO INDICATE TIRE PRESSURE

[76] Inventor: Jiaa Chi, P.O. Box 82-144, Taipei, Taiwan

[21] Appl. No.: 49,902

[22] Filed: Mar. 30, 1998

[51] Int. Cl.⁶ .................................................. B60C 23/04
[52] U.S. Cl. ........................................ 73/146.8; 116/34 R
[58] Field of Search .......................... 73/146.8; 116/34 R

[56] References Cited

U.S. PATENT DOCUMENTS

| | | | |
|---|---|---|---|
| 1,807,752 | 6/1931 | Poster | 73/146.8 |
| 2,225,675 | 12/1940 | West | 73/146.8 X |

*Primary Examiner*—Joseph L. Felber
*Attorney, Agent, or Firm*—A & J

[57] ABSTRACT

A tire pressure cover utilizing colors to indicate tire pressure includes mainly a transparent cover and a metal housing. The metal housing houses an alarm bolt, a spring, a floating seat, a rubber pad, an air ventilating plate, and a gasket. When the tire pressure cover is locked to the air nozzle of a tire, the air inside the tire will enter the tire pressure cover and pass through the air ventilating plate to push the rubber pad, which in turn forces the floating seat thereon to rise so that the spring disposed in the floating seat is compressed. The floating seat will become stationary when the internal and external pressure of the tire pressure cover and the tire are balanced. The alarm bolt has a red section and a yellow section. When the floating seat elevates, it may conceal the alarm bolt completely or in part. The user may, by looking at the color exposed on the alarm bolt to determine whether the tire pressure is sufficient. When the yellow section is shown, it indicates the tire pressure is adequate. When the red section is shown, it indicates that inflation is required. The tire pressure cover, which is simple in construction, may thus ensure driving safety.

5 Claims, 3 Drawing Sheets

TIRE VALVE PRESSURE-INDICATING COVER UTILIZING COLORS TO INDICATE TIRE PRESSURE

BACKGROUND OF THE INVENTION

1. Field of the Invention

The present invention relates to a tire pressure cover utilizing colors to indicate tire pressure.

2. Description of the Prior Art

In the past, to judge the size of tire pressure, users generally use the hand to press the tire and "feel" whether the pressure is adequate, which is not scientific. Besides, the possibility of error is high. There have been developed different kinds of meters or gauges to facilitate the measurement of tire pressure. However, such meters or gauges can be used to measure the tire pressure at a given time. There is no device available to track the tire pressure over a period of time or warn the user when the tire pressure is insufficient.

A prior art device discloses an air nozzle accommodating therein an inner air chamber and an outer air chamber in a two-layer construction. A narrow channel connects the inner and outer air chambers, and a buoy is disposed in the channel and is caused to move upwardly or downwardly by the pressure between the air chambers so as to indicate the size of pressure inside the tire. However, there is not any markings on the buoy to indicate the size of the tire pressure, and the judgment of tire pressure depends mainly on the movement of the buoy. Precision is therefore very low. In addition, such prior art devices are complicated in construction and hence costly to manufacture.

SUMMARY OF THE INVENTION

The present invention relates to a tire pressure cover utilizing colors to indicate tire pressure.

A primary object of the present invention is to provide a tire pressure cover structure utilizing colors to indicate tire pressure. According to the present invention, a tire pressure cover is screwably locked to an air nozzle of the tire such that air inside the tire enters the tire pressure cover and passes through an air ventilating plate to push a rubber pad, which in turn causes a floating seat to rise to compress a spring disposed thereon and to conceal an alarm bolt having two sections of different colors disposed above in part or completely. The user may observe through a transparent cover the color visible on the alarm bolt, i.e., not concealed by the floating seat, to precisely tell whether the tire pressure is sufficient. The tire pressure cover structure of the present invention is simple in construction and hence inexpensive to manufacture.

Besides, it has the following advantages:

1. There is no need to do a routine inspection of the tires before driving. After the tire pressure cover has been installed on the tire, the user may easily tell from the color visible on the alarm bolt whether the tire pressure is sufficient.

2. The present invention enables the user to know whether the tires have been damaged or the tire pressure is not adequate at any time, thus enhancing driving safety.

3. The present invention is adapted to be used in all weather conditions. It is water-proof and oil-proof. The pressure tire cover is housed in a metal housing which is processed to be corrosion-resistant.

4. The present invention enables ordinary users to easily measure or judge the tire pressure. There is no need for a technician or engineer.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
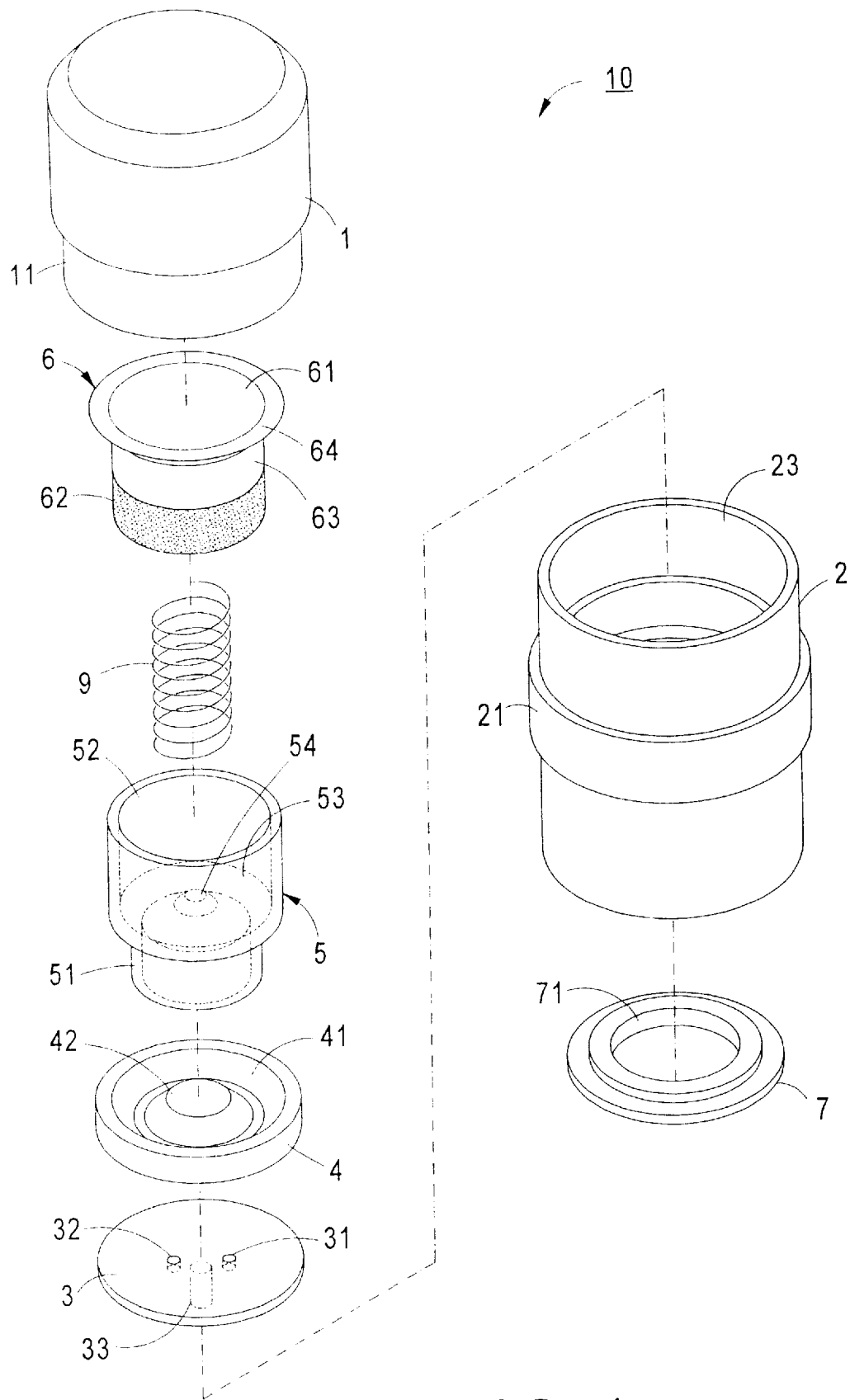
FIG. 1 is a perspective exploded view of the tire pressure cover according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIG. 1, the present invention comprises a transparent cover 1, a hollow metal housing 2, and an air ventilating plate 3, a rubber pad 4, a floating seat 5, a hollow alarm bolt 6, and a spring 9 disposed within the transparent cover 1.

The transparent cover 1 includes a hollow cylindrical body provided with a flange 11 formed at a bottom portion thereof and having a diameter slightly smaller than that of the body.

The metal housing 2 includes a non-skid raised portion 21 provided on its surface, a lower threaded hole 22 at a lower end of its interior (see FIG. 2), an upper recess 23, and a small bolt hole 24 disposed between and communicating with the upper recess 23 and the lower threaded hole 22. The upper recess 23 may fittingly coupled with the flange 11 of the transparent cover 1. The air ventilating plate 3 is provided with at least two air vents 31, 32, and a projection 33 at a bottom side to press a plug of an air nozzle of a tire.

The rubber pad 4 is disposed on the air ventilating plate 3. The rubber pad 4 includes a circumferential depression 41 and a conical portion 42 projecting from the center thereof.

The floating seat 5 is a stepped cylindrical structure including a hollow base 51, a hollow top seat 52 of a diameter larger than that of the base 51, a partition layer 53 between the top seat 52 and the base 51, and a projecting bolt 54 located at the center of the partition layer 53. The top seat 52 receives the spring 9 inserted thereinto. A bottom end of the spring 9 surrounds the projecting bolt 54 whereas a top end thereof is fitted into the hollow alarm bolt 6.

Figure 3:
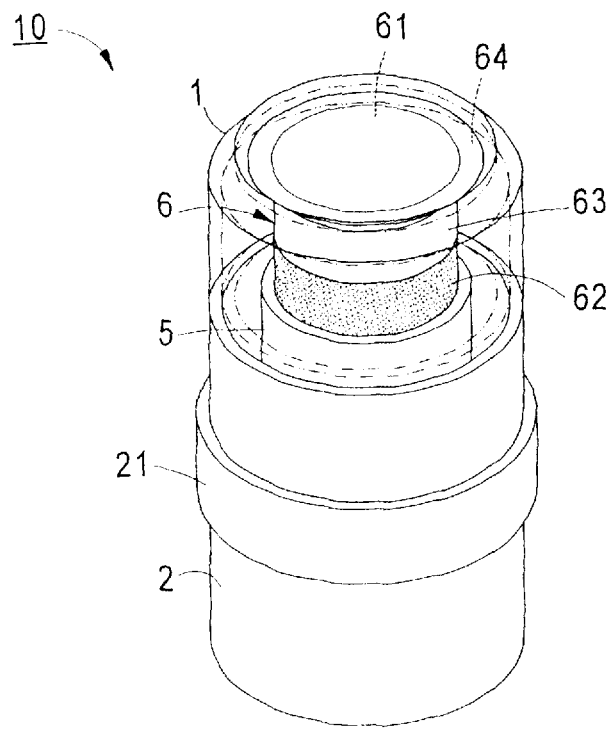
FIG. 3 is a perspective assembled view of the tire pressure cover according to the present invention.

The surface of the alarm bolt 6 has two colors, i.e., yellow and red, with the yellow color on top of the red color. In the drawings, the yellow bolt body is referenced by the numeral 63, whereas the red bolt body is referenced by 62. A top side of the alarm bolt 6 is a yellow round disk 64 on which a label or sticker 61 may adhere. The sticker 61 has markings 61 indicating the recommended tire pressure value (which is determined depending on the size, model, and brand of the tire). The user may observe the markings on the label 61 through the transparent cover 1, as shown in FIG. 3 which is the perspective assembled view of the present invention. The user may then select a tire pressure cover that is suitable for use on his/her own tire. Furthermore, there is provided a gasket 7 which is stepped to have a raised inner portion and a central through hole 71, which is fitted over the small bolt hole 24 of the metal housing 2 to avoid leakage of gas.

Figure 2:
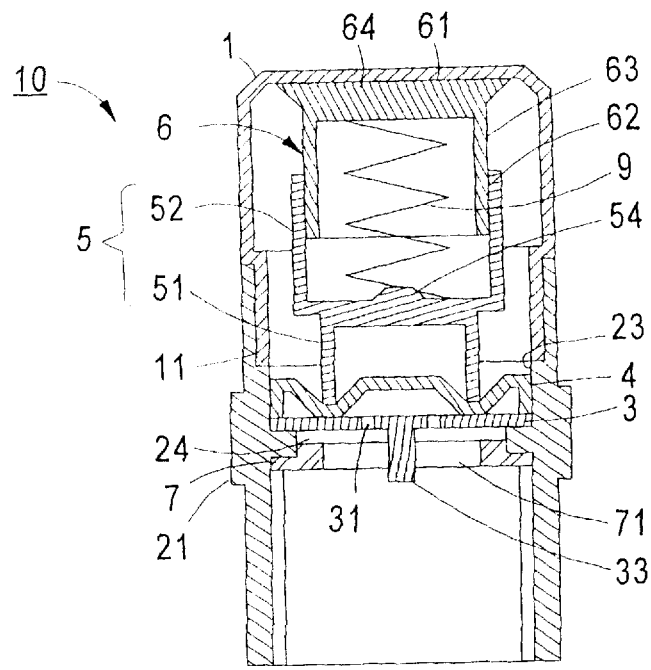
FIG. 2 is a sectional assembled view of the tire pressure cover according to the present invention.

Referring to FIG. 2, it is shown that the metal housing 2 has the lower threaded hole 22, an upper recess 23, and a small bolt hole 24. The gasket 7 tightly abuts the small bolt hole 24, while the air ventilating plate 3 tightly seals the bottom of the upper recess 23, with projection 33 passing through the small bolt hole 24 to project from the center of the lower threaded hole 22. The rubber pad 4 is disposed inside the upper recess 23 and urges against the floating seat 5. The hollow top seat 52 of the floating seat 5 in turn urges against the spring 9, which in turn urges against the hollow alarm bolt 6 above. After the transparent cover 1 is coupled to the metal housing 2 below, a permanently fixed and undetachable tire pressure cover 10 is accomplished.

FIG. 3 shows the present invention in an assembled state. At this point, a tire pressure cover 10 has not been connected to an air nozzle 8 of the tire, and the floating seat 5 is subjected to the action of the spring 9 and located at a relatively low position, whereas the alarm bolt 6, also subjected to the action of the spring 9, is located at an upper position. Therefore, by looking through the transparent cover 1, the yellow and red bolt bodies 63 and 62 of the alarm bolt 6 may be observed.

Figure 4:
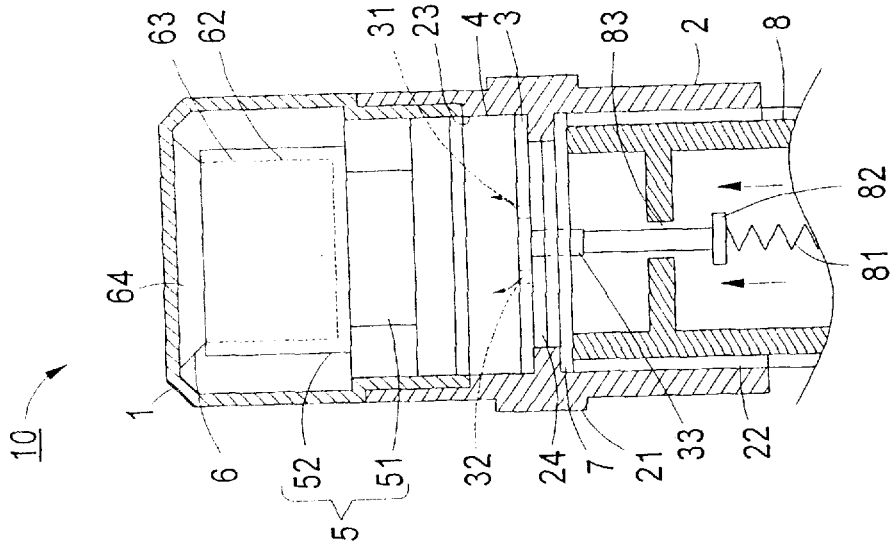
FIGS. 4, 5, and 6 are respective schematic views illustrating operation of the tire pressure cover according to the present invention after it is coupled to an air nozzle of the tire.

After the tire pressure cover 10 is coupled to the air nozzle 8 of the tire, as shown in FIG. 4, the projection 33 of the air ventilating plate 3 will urge against a push pin 82 inside the air nozzle 8 so that the push pin 82 lowers and forces a spring 81 to be compressed, further causing air pressure inside the tire to enter via an opening 83 of the air nozzle 8 into the tire pressure cover 10. After the air has entered the tire pressure cover 10, it will pass through the air vents 31 and 32 of the air ventilating plate 3 and force the rubber pad 4 to elevate, which in turn compels the floating seat 5 to rise and compress the spring 9.

Figure 5:
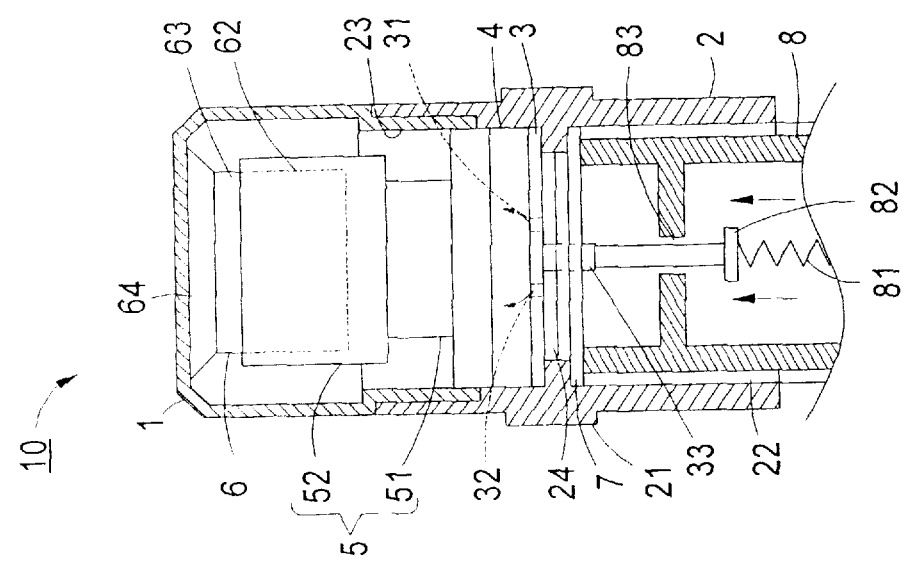

Since the spring 9 has elasticity, different tire pressures will cause the floating seat 5 to rise to a different height. When the tire pressure is low, the floating seat 5 will automatically drop, as shown in FIG. 5. If the yellow bolt body 63 is observed at the alarm bolt 6, this indicates that the tire pressure has decreased, but there is still no need to inflate the tire. On the other hand, if the red bolt body 62 is shown at the alarm bolt 6, it indicates that the tire pressure is not enough and inflation is required to ensure driving safety.

Figure 6:
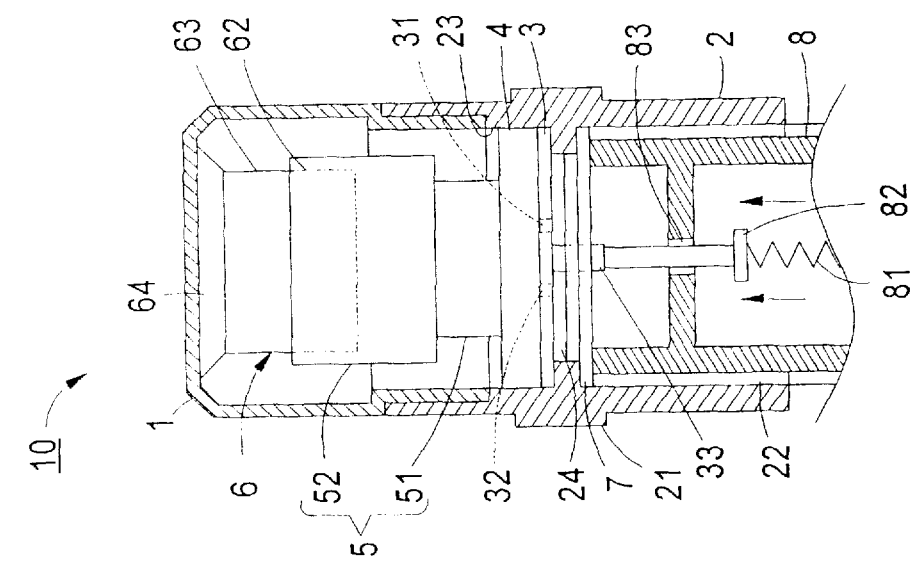

When the tire is fully inflated, the tire pressure will be greater than the force of the spring 9, so that the floating seat 5 rises to the uppermost end, as shown in FIG. 6.

Therefore, it can be appreciated that the user may observe the alarm bolt 6 with his/her naked eyes to see whether the tire needs to be inflated. If the red bolt body 62 is shown, he/she may then find a car shop to inflate the tire, thus ensuring driving safety.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A tire value pressure-indicating cover utilizing colors to indicate tire pressure, comprising a transparent cover, an alarm bolt, a spring, a floating seat, a rubber pad, an air ventilating plate, a metal housing, and a gasket, wherein said metal housing has a hollow upper recess at an upper end, a lower threaded hole at a lower end, a small bolt hole between said upper recess and said lower threaded hole, said upper recess being sealingly coupled to a flange at a bottom portion of said transparent cover, said air ventilating plate being disposed at a bottom portion inside said upper recess, said rubber pad being located on said air ventilating plate, said floating seat being disposed on said rubber pad and receiving said spring insertably disposed therein, said spring urging against said alarm bolt disposed above, said alarm bolt having two sections of different colors, said gasket being disposed inside said small bolt hole, said air ventilating plate having at least one air vent to allow passage of air therethrough and a projection extending from a bottom side thereof, whereby said floating seat is subjected to the pressure of a tire and the action of said spring urging thereagainst so that it may elevate or drop in position to allow said alarm bolt to expose said colors thereon, thereby allowing the user to judge whether the tire pressure is sufficient.

2. The tire pressure cover as claimed in claim 1, wherein said alarm bolt includes a round disk at a top side thereof, to which a sticker may be adhered to indicate the recommended tire pressure value.

3. The tire pressure cover as claimed in claim 1, wherein said floating seat includes a hollow upper seat and a hollow base integrally assembled together, and a partition layer disposed intermediate said upper seat and said hollow base, said partition layer having a projecting bolt at a center thereof.

4. The tire pressure cover as claimed in claim 1, wherein said gasket is stepped to include an inner raised portion and has a central through hole.

5. The tire pressure cover as claimed in claim 1, wherein said rubber pad is circular and has a circumferential depression and a conical portion at a center thereof.

* * * * *

(12) REEXAMINATION CERTIFICATE (4738th)
United States Patent
Chi

(10) Number: US 5,886,254 C1
(45) Certificate Issued: Feb. 18, 2003

(54) TIRE VALVE PRESSURE-INDICATING COVER UTILIZING COLORS TO INDICATE TIRE PRESSURE

(75) Inventor: Jiaa Chi, P.O. Box 82-144, Taipei (TW)

(73) Assignee: Jiaa Chi, Taipei (TW)

Reexamination Request:
No. 90/006,216, Feb. 11, 2002

Reexamination Certificate for:
Patent No.: 5,886,254
Issued: Mar. 23, 1999
Appl. No.: 09/049,902
Filed: Mar. 30, 1998

(51) Int. Cl.$^7$ ............................................. B60C 23/04
(52) U.S. Cl. ................................. 73/146.8; 116/34 R
(58) Field of Search ...................... 73/146.8; 116/34 R

(56) References Cited

U.S. PATENT DOCUMENTS

| | | | |
|---|---|---|---|
| 4,072,048 A | 2/1978 | Arvan | 73/146.8 |
| 4,164,196 A | 8/1979 | Stradella et al. | 73/744 |
| 5,014,643 A | 5/1991 | Huang | 73/146.8 |

*Primary Examiner*—William L. Oeh

(57) ABSTRACT

A tire pressure cover utilizing colors to indicate tire pressure includes mainly a transparent cover and a metal housing. The metal housing houses an alarm bolt, a spring, a floating seat, a rubber pad, an air ventilating plate, and a gasket. When the tire pressure cover is locked to the air nozzle of a tire, the air inside the tire will enter the tire pressure cover and pass through the air ventilating plate to push the rubber pad, which in turn forces the floating seat thereon to rise so that the spring disposed in the floating seat is compressed. The floating seat will become stationary when the internal and external pressure of the tire pressure cover and the tire are balanced. The alarm bolt has a red section and a yellow section. When the floating seat elevates, it may conceal the alarm bolt completely or in part. The user may, by looking at the color exposed on the alarm bolt to determine whether the tire pressure is sufficient. When the yellow section is shown, it indicates the tire pressure is adequate. When the red section is shown, it indicates that inflation is required. The tire pressure cover, which is simple in construction, may thus ensure driving safety.

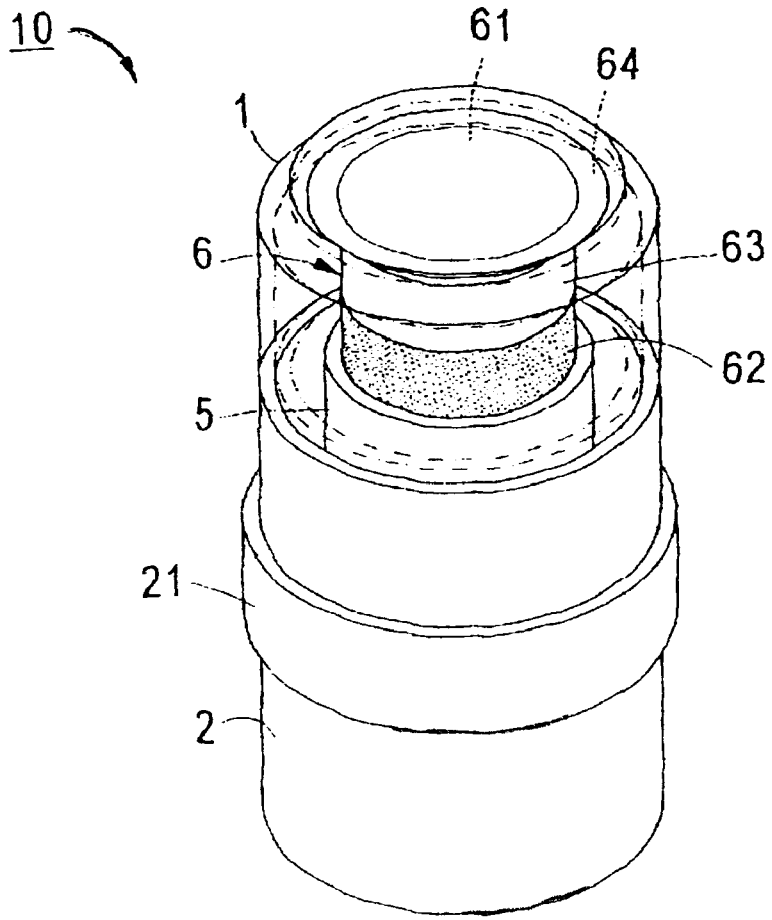

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim(s) 1–5 is confirmed.

* * * * *